United States Patent
Suzuki (10) Patent No.: US 12,459,563 B2
(45) Date of Patent: Nov. 4, 2025

(54) DRIVING CONTROL DEVICE

(71) Applicant: ISUZU MOTORS LIMITED, Tokyo (JP)

(72) Inventor: Motoya Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 46 days.

(21) Appl. No.: 18/551,131

(22) PCT Filed: Mar. 24, 2022

(86) PCT No.: PCT/JP2022/014165
§ 371 (c)(1),
(2) Date: Sep. 18, 2023

(87) PCT Pub. No.: WO2022/203026
PCT Pub. Date: Sep. 29, 2022

(65) Prior Publication Data
US 2024/0158007 A1    May 16, 2024

(30) Foreign Application Priority Data
Mar. 26, 2021    (JP) .................................. 2021-053283

(51) Int. Cl.
*B62D 6/00*    (2006.01)
(52) U.S. Cl.
CPC .................................. *B62D 6/002* (2013.01)
(58) Field of Classification Search
CPC ......... B62D 6/002; B62D 6/04; B62D 15/025
USPC ........................................ 701/41, 42, 43, 44
See application file for complete search history.

(56) References Cited

U.S. PATENT DOCUMENTS

| | | |
|---|---|---|
| 8,340,883 B2 | 12/2012 | Arbitmann et al. |
| 9,058,246 B2 | 6/2015 | Shida |
| 11,608,108 B2 | 3/2023 | Maruyama et al. |

(Continued)

FOREIGN PATENT DOCUMENTS

| | | | | |
|---|---|---|---|---|
| JP | 2001-034341 A | | 2/2001 | |
| JP | 2004042884 A | * | 2/2004 | ........... G05D 1/0206 |

(Continued)

OTHER PUBLICATIONS

International Search Report from International Application No. PCT/JP2022/014165 mailed Jun. 14, 2022.

*Primary Examiner* — Hai H Huynh
(74) *Attorney, Agent, or Firm* — Shih IP Law Group, PLLC (57) ABSTRACT

A driving control device has: a generating section that generates a first vehicle model representing a relationship among the longitudinal speed of the vehicle, the lateral speed of the vehicle, the weight, the center-of-mass position of the vehicle, the steering angle, the lateral deviation of the vehicle, the azimuth deviation and the curvature of a road surface where the vehicle is traveling; calculating section that inputs the lateral deviation, the azimuth deviation and the curvature to an evaluation function corresponding to the first vehicle model corresponding to the longitudinal speed, the lateral speed, the weight and the center-of-mass position, and calculates a corrected steering angle for minimizing or maximizing an output value of the evaluation function; and a travel control section that causes the vehicle to travel on a basis of the corrected steering angle.

7 Claims, 5 Drawing Sheets

(56) References Cited

U.S. PATENT DOCUMENTS

| | | | |
|---|---|---|---|
| 11,745,706 B2 * | 9/2023 | Nakagawa | B60W 30/12 701/72 |
| 11,872,983 B2 | 1/2024 | Matsunaga | |
| 11,884,273 B2 | 1/2024 | Uemura et al. | |
| 2004/0024565 A1 | 2/2004 | Yu | |
| 2006/0033308 A1 | 2/2006 | Waldbauer et al. | |
| 2009/0099717 A1 | 4/2009 | Yabushita | |
| 2009/0287376 A1 | 11/2009 | Aso | |
| 2011/0106391 A1 | 5/2011 | Shida | |
| 2020/0149906 A1 | 5/2020 | Tu | |
| 2020/0238980 A1 | 7/2020 | Goto et al. | |
| 2020/0249038 A1 | 8/2020 | Nashed | |
| 2020/0307612 A1 | 10/2020 | Nakamura | |
| 2021/0009115 A1 | 1/2021 | Ohmura | |

FOREIGN PATENT DOCUMENTS

| | | | | |
|---|---|---|---|---|
| JP | 3707199 B2 * | 10/2005 | | B62D 6/00 |
| JP | 2008-143269 A | 6/2008 | | |
| JP | 4297123 B2 | 7/2009 | | |
| JP | 2012-002678 A | 1/2012 | | |
| JP | 2012-126293 A | 7/2012 | | |
| JP | 2014-142303 A | 8/2014 | | |
| JP | 6477253 B2 | 12/2016 | | |
| JP | 2019-142303 A | 8/2019 | | |
| JP | 2019-156059 A | 9/2019 | | |
| JP | 2019-189121 A | 10/2019 | | |
| JP | 2020-026189 A | 2/2020 | | |
| JP | 2020-164061 A | 10/2020 | | |
| JP | 2021-503404 A | 2/2021 | | |
| WO | 2010100725 A1 | 9/2010 | | |

* cited by examiner

DRIVING CONTROL DEVICE

The present application is a U.S. National Stage entry of PCT Application number PCT/JP2022/014165, filed on Mar. 24, 2022, which claims priority under 35 U.S.C § 119(a) to Japanese Patent Application No. 2021-053283, filed on Mar. 26, 2021, contents of which are incorporated herein by reference in their entirety.

TECHNICAL FIELD

The present invention relates to a driving control device.

BACKGROUND OF THE INVENTION

There are conventionally known travel control systems for causing a vehicle to travel along a target track. Patent Document 1 discloses a travel control system that decides the curvature of a target track on the basis of a vehicle speed.

PRIOR ART

Patent Document

Patent Document 1: Japanese Patent No. 4297123

SUMMARY OF INVENTION

Problems To Be Solved By The Invention

Conventional travel control systems calculate a steering angle for causing a vehicle to travel along a target track by using a vehicle model to which the weight and the center-of-mass position of the vehicle have been input in advance as fixed values. However, in a case where the number of humans who got in the vehicle or the weight of items loaded into the vehicle changed, the weight and the center-of-mass position of the vehicle are different from the weight and the center-of-mass position of the vehicle that were input as the fixed values to the vehicle model. As a result, there has been a problem that the travel control systems cannot highly precisely calculate a steering angle for causing the vehicle to travel along a target track, and accordingly cannot cause the vehicle to travel along the target track in some cases.

In view of this, the present invention has been made taking these matters into consideration, and an object thereof is to cause a vehicle to travel along a target track.

Means For Solving The Problems

A driving control device according to a first aspect of the present invention has: an acquiring section that acquires: a weight of a vehicle; a center-of-mass position of the vehicle; a longitudinal speed which is a speed of the vehicle in an advancing direction; a lateral speed which is a speed of the vehicle in a direction orthogonal to the advancing direction; a steering angle of the vehicle; a lateral deviation of the vehicle; an azimuth deviation which is a difference between an orientation of the vehicle at a position where the vehicle is travelling and a target orientation of the vehicle corresponding to the position; and a curvature of a road surface where the vehicle is travelling; a generating section that generates a first vehicle model representing a relationship among the longitudinal speed, the lateral speed, the weight, the center-of-mass position, the steering angle, the lateral deviation, the azimuth deviation and the curvature; a calculating section that inputs the lateral deviation, the azimuth deviation and the curvature that are acquired by the acquiring section to an evaluation function corresponding to the first vehicle model corresponding to the longitudinal speed, the lateral speed, the weight and the center-of-mass position that are acquired by the acquiring section, and calculates a corrected steering angle for minimizing or maximizing an output value of the evaluation function; and a travel control section that causes the vehicle to travel on a basis of the corrected steering angle.

The driving control device may further have an identifying section that estimates a noise included in the lateral deviation and the azimuth deviation that are acquired by the acquiring section, and identifies a corrected lateral deviation and a corrected azimuth deviation from which the noise is excluded, by inputting the steering angle and the curvature that are acquired by the acquiring section to a state space model corresponding to the first vehicle model corresponding to the longitudinal speed, the lateral speed, the weight and the center-of-mass position that are acquired by the acquiring section, and the calculating section may input the corrected lateral deviation and the corrected azimuth deviation that are identified by the identifying section, and the curvature to the evaluation function, and calculate the corrected steering angle for minimizing or maximizing the output value of the evaluation function.

The generating section may derive a state space model of a discrete-time type from the first vehicle model after generating the first vehicle model of a continuous-time type including a vehicle plant model representing a movement of the vehicle and a route following model representing a track along which the vehicle has moved, and the identifying section may identify an observation noise and a system noise included in the lateral deviation and the azimuth deviation that are acquired by the acquiring section by adjusting an innovation gain included in the state space model, and identify, from the lateral deviation and the azimuth deviation, the corrected lateral deviation and the azimuth deviation from which the observation noise and the system noise are excluded.

A driving control device according to a second aspect of the present invention has: an acquiring section that acquires: a weight of a vehicle; a center-of-mass position of the vehicle; a longitudinal speed which is a speed of the vehicle in an advancing direction; a lateral speed which is a speed of the vehicle in a direction orthogonal to the advancing direction; a steering angle of the vehicle; a lateral deviation of the vehicle; an azimuth deviation which is a difference between an orientation of the vehicle at a position where the vehicle is travelling and a target orientation of the vehicle corresponding to the position; and a curvature of a road surface where the vehicle is travelling; a generating section that generates a first vehicle model representing a relationship among the longitudinal speed, the lateral speed, the weight, the center-of-mass position, the steering angle, the lateral deviation, the azimuth deviation and the curvature; a calculating section that inputs the longitudinal speed, the lateral speed, the lateral deviation, the azimuth deviation and the curvature that are acquired by the acquiring section to an evaluation function corresponding to the first vehicle model corresponding to the weight and the center-of-mass position that are acquired by the acquiring section, and calculates at least any one of a corrected acceleration and a corrected steering angle for minimizing or maximizing an output value of the evaluation function; and a travel control section that causes the vehicle to travel on a basis of the at least any one of the corrected acceleration and the corrected steering angle.

The driving control device may further have an identifying section that estimates a noise included in the longitudinal speed, the lateral speed, the lateral deviation and the azimuth deviation that are acquired by the acquiring section, and identifies a corrected longitudinal speed, a corrected lateral speed, a corrected lateral deviation and a corrected azimuth deviation from which the noise is excluded, by inputting the steering angle and the curvature that are acquired by the acquiring section to the first vehicle model corresponding to the weight and the center-of-mass position that are acquired by the acquiring section, and the calculating section may input the corrected longitudinal speed, the corrected lateral speed, the corrected lateral deviation and the corrected azimuth deviation that are identified by the identifying section, and the curvature to the evaluation function, and calculate at least any one of the corrected acceleration and the corrected steering angle for minimizing or maximizing the output value of the evaluation function.

The generating section may derive a state space model of a discrete-time type from the first vehicle model after generating the first vehicle model of a continuous-time type including a vehicle plant model representing a movement of the vehicle and a route following model representing a track along which the vehicle has moved, and the identifying section may identify an observation noise and a system noise included in the lateral deviation and the azimuth deviation that are acquired by the acquiring section by adjusting an innovation gain included in the state space model, and identify, from the lateral deviation and the azimuth deviation, the corrected lateral deviation and the azimuth deviation from which the observation noise and the system noise are excluded.

The generating section may generate the first vehicle model and a second vehicle model which is a non-linear vehicle model different from the first vehicle model, and the calculating section may calculate at least any one of the corrected acceleration and the corrected steering angle by using at least one of the first vehicle model and the second vehicle model.

The acquiring section may acquire at least any one of the weight, the center-of-mass position, the longitudinal speed and the lateral speed periodically, and the generating section may generate the first vehicle model corresponding to a time of a period next to a period corresponding to a time at which the acquiring section has acquired at least any one of the weight, the center-of-mass position, the longitudinal speed and the lateral speed.

Effect Of The Invention

The present invention attains the effect of being able to cause a vehicle to travel along a target track.

DETAILED DESCRIPTION OF THE INVENTION

Overview of Driving Control System S

Figure 1:
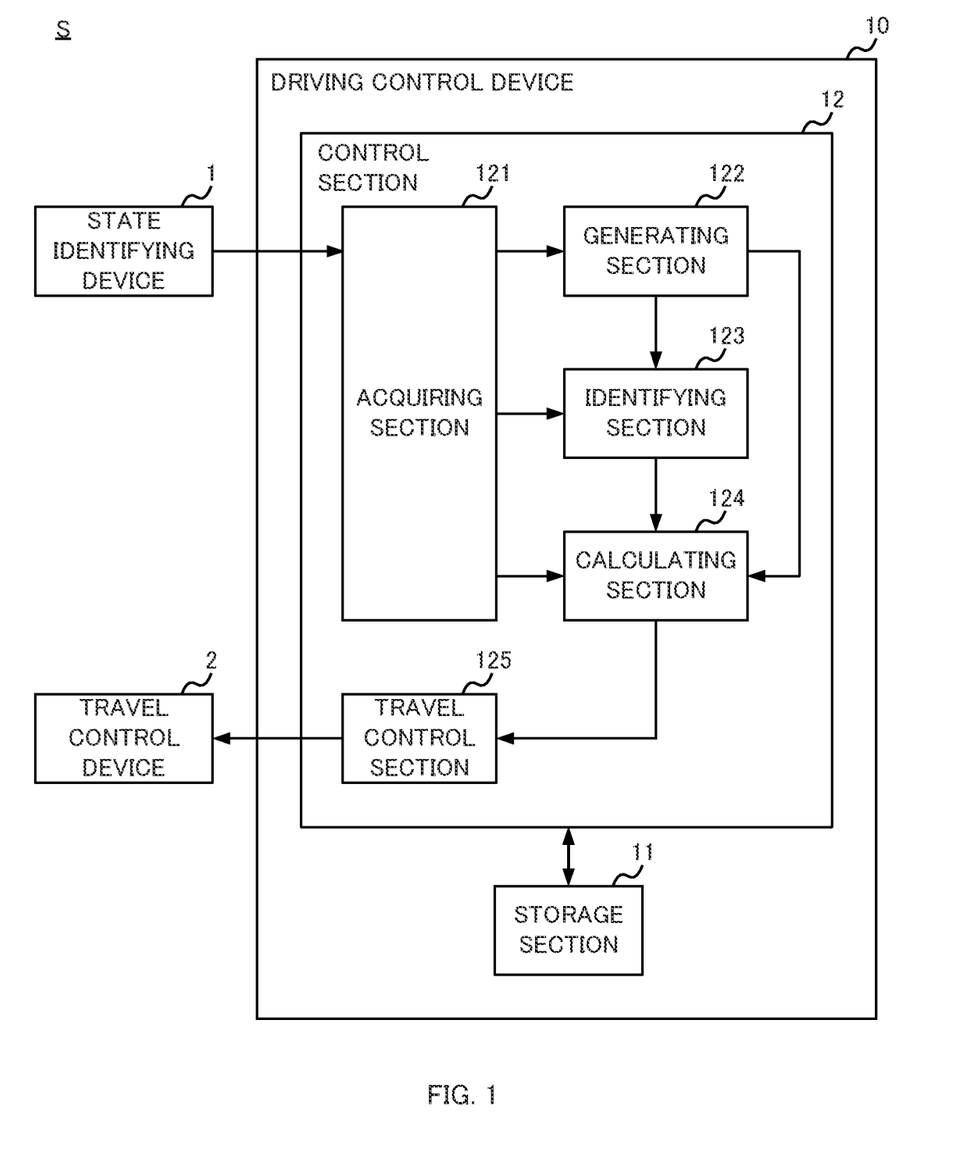
FIG. 1 is a figure depicting the configuration of a driving control system S.

FIG. 1 is a figure depicting the configuration of a driving control system S. The driving control system S includes a state identifying device 1, a travel control device 2 and a driving control device 10. The driving control system S is a system for causing a vehicle to travel along a target track by controlling the steering angle of the vehicle, and is a system included in the vehicle. The target track is a predetermined track, and includes a plurality of target travelling positions of the vehicle, and target orientations of the vehicle each of which corresponds to one of the plurality of travelling positions. For example, the target track is stored on a storage section (not depicted) of the state identifying device 1.

The state identifying device 1 periodically identifies parameters representing the vehicle state. For example, the parameters representing the vehicle state are the weight, the center-of-mass position, the speed, the steering angle, the lateral deviation and the azimuth deviation of the vehicle, and the curvature of a road surface. The lateral deviation is the difference between a position where the vehicle is travelling and a target travelling position of the vehicle in a direction orthogonal to the advancing direction of the vehicle. The azimuth deviation is the difference between the orientation of the vehicle at a position where the vehicle is travelling and a target orientation of the vehicle corresponding to the position.

For example, the state identifying device 1 measures the weight of humans who got in the vehicle, and the weight of items loaded in the vehicle. The state identifying device 1 identifies the weight of the travelling vehicle on the basis of the measured weight of humans, the measured weight of items and the weight of the vehicle. The state identifying device 1 identifies the center-of-mass position of the vehicle on the basis of the identified weight of the vehicle and the wheelbase of the vehicle.

For example, the state identifying device 1 identifies the longitudinal speed which is a speed of the vehicle in the advancing direction, and the lateral speed which is a speed of the vehicle in a direction orthogonal to the advancing direction, on the basis of the vehicle speed measured by a speed sensor (not depicted) included in the vehicle. For example, the state identifying device 1 acquires the steering angle of the vehicle measured by a steering angle sensor included in the vehicle. The steering angle acquired by the state identifying device 1 is the rotation angle of a steering wheel shaft or the difference between the orientation of the vehicle and the orientation of tires included in the vehicle.

For example, the state identifying device 1 acquires the position and the orientation of the vehicle by acquiring GPS (Global Positioning System) signals. The state identifying device 1 identifies the lateral deviation of the vehicle on the basis of the acquired position of the vehicle and a target travelling position of the vehicle corresponding to the position of the vehicle. The state identifying device 1 identifies the azimuth deviation of the vehicle on the basis of the acquired orientation of the vehicle and a target orientation of the vehicle corresponding to the position of the vehicle.

For example, the state identifying device 1 identifies the curvature of the road surface corresponding to the acquired position of the vehicle on the basis of map information stored on the storage section of the state identifying device 1. The state identifying device 1 periodically outputs, to the driving control device 10, the identified center of mass, the center-of-mass position, the longitudinal speed, the lateral speed, the steering angle, the lateral deviation and the azimuth deviation of the vehicle, and the identified curvature of the road surface.

The travel control device 2 controls the speed and the orientation of the vehicle. The travel control device 2 controls the orientation of the vehicle in accordance with the steering angle at a time of the next period (hereinafter, called a "corrected steering angle") periodically output by the driving control device 10.

The driving control device 10 periodically generates a vehicle model corresponding to the vehicle state input from the state identifying device 1. The driving control device 10 periodically calculates the corrected steering angle by using the generated vehicle model in order to cause the vehicle to travel in a target direction. For example, calculating periodically means performing calculation at sampling intervals. The driving control device 10 causes the vehicle to travel in the target direction by inputting the calculated corrected steering angle to the travel control device 2. Hereinbelow, the configuration of and an operation performed by the driving control device 10 are explained in detail.

Configuration of Driving Control Device 10

The driving control device 10 has a storage section 11 and a control section 12. The control section 12 has an acquiring section 121, a generating section 122, an identifying section 123, a calculating section 124 and a travel control section 125. The driving control device 10 generates the vehicle model on the basis of the parameters representing the vehicle state output by the state identifying device 1, periodically calculates the corrected steering angle by using an evaluation function corresponding to the generated vehicle model, and outputs the corrected steering angle to the travel control device 2.

The storage section 11 has a storage medium such as a ROM (Read Only Memory), a RAM (Random Access Memory) or an SSD (Solid State Drive). The storage section 11 has stored thereon control programs to be executed by the control section 12. For example, the control section 12 is a CPU (Central Processing Unit). The control section 12 operates as the acquiring section 121, the generating section 122, the identifying section 123, the calculating section 124 and the travel control section 125 by executing the programs stored on the storage section 11.

The acquiring section 121 periodically acquires the parameters representing the vehicle state output by the state identifying device 1. The acquiring section 121 acquires: the weight of the vehicle; the center-of-mass position of the vehicle; the longitudinal speed which is a speed of the vehicle in the advancing direction; the lateral speed which is a speed of the vehicle in a direction orthogonal to the advancing direction; the steering angle of the vehicle; the lateral deviation of the vehicle; the azimuth deviation which is the difference between the orientation of the vehicle at a position where the vehicle is travelling and a target orientation of the vehicle corresponding to the position; and the curvature of a road surface where the vehicle is travelling.

Figure 2:
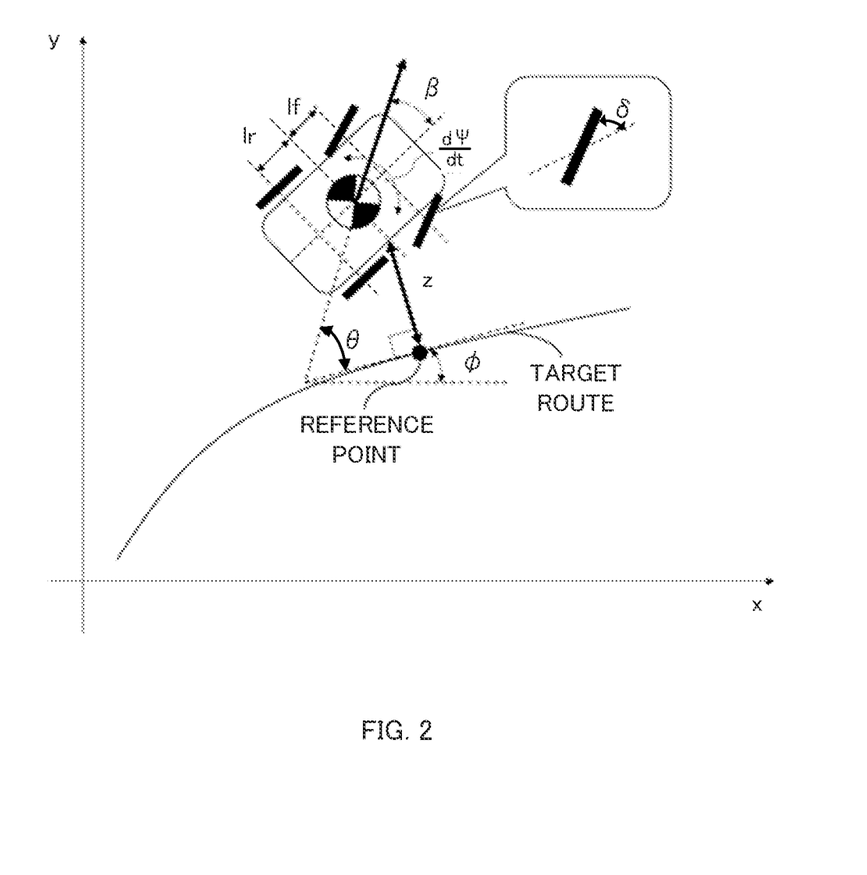
FIG. 2 is a figure for explaining a vehicle model generated by a generating section 122.

The generating section 122 generates a first vehicle model representing the relationship among the longitudinal speed, the lateral speed, the weight, the center-of-mass position, the steering angle, the lateral deviation and the azimuth deviation of the vehicle, and the curvature of the road surface. FIG. 2 is a figure for explaining the vehicle model generated by the generating section 122. For example, the generating section 122 generates the vehicle model corresponding to a reference point depicted in FIG. 2.

The generating section 122 may generate the first vehicle model corresponding to a time of a period next to a period corresponding to a time at which the acquiring section 121 acquired at least any one of the weight, the center-of-mass position, the longitudinal speed and the lateral speed of the vehicle, in response to the periodic acquisition of the at least any one of the weight, the center-of-mass position, the longitudinal speed and the lateral speed by the acquiring section 121. For example, the generating section 122 periodically generates the first vehicle model in which at least any one of the center of mass, the center-of-mass position, the longitudinal speed and the lateral speed of the vehicle is updated.

As a vehicle model of a continuous-time type, the generating section 122 generates a vehicle plant model representing a movement of the vehicle and a route following model representing a track along which the vehicle moved. Next, the generating section 122 derives a state equation of a discrete-time type (hereinafter, called a "state space model" in some cases) from the generated vehicle model of the continuous-time type. In the present embodiment, as an example, the vehicle model is generated by using an equivalent two-wheel model.

First, the vehicle plant model is explained. The vehicle movement corresponding to the reference point depicted in FIG. 2 can be expressed as in the following Formula (1) and Formula (2) by using the longitudinal speed vx of the vehicle, the lateral speed vy of the vehicle, the yaw angle ψ, the vehicle speed v and the steering angle input δ.

[Equation 1]

$$\frac{dv_y(t)}{dt} = a_{11}v_y(t) + \left(-v_x(t) + \frac{a_{12}}{v_x(t)}\right)\frac{d\psi(t)}{dt} + a_{13}\delta(t) \quad (1)$$

$$\frac{d^2\psi(t)}{dt^2} = \frac{a_{21}}{v_x(t)}v_y(t) + \frac{a_{22}}{v_x(t)}\frac{d\psi(t)}{dt} + a_{23}\delta(t) \quad (2)$$

Note that it is assumed that the longitudinal speed vx of the vehicle is constant, and the slip angle is sufficiently small, and it is assumed that the following Formula (3) holds true.

[Equation 2]

$$v_y = v_x \sin(\beta(t)) \approx v_x \beta(t) \quad (3)$$

The coefficient $a_{ij}$ (i, j=1, 2, 3) used in Formula (1) and Formula (2) is calculated in accordance with the following Formula (4) to Formula (9) by using the cornering coefficient Kf of the front wheels, the cornering coefficient Kr of the rear wheels, the distance lf from the center of mass to the front wheels, the distance lr from the center of mass to the rear wheels, the weight m of the vehicle and the moment of inertia I.

[Equation 3]

$$a_{11} = -\frac{K_f + K_r}{m} \quad (4)$$

$$a_{12} = \frac{-l_f K_f + l_r K_r}{m} \quad (5)$$

$$a_{13} = \frac{K_f}{m} \quad (6)$$

$$a_{21} = \frac{-l_f K_f + l_r K_r}{I} \quad (7)$$

$$a_{22} = -\frac{l_f^2 K_f + l_r^2 K_r}{I} \quad (8)$$

$$a_{23} = \frac{l_f K_f}{I} \quad (9)$$

A formula for calculating the curvature κ representing the track along which the vehicle travels is represented by the following Formula (10) on the basis of Formula (1) and Formula (2).

[Equation 4]

$$\kappa(t) = \frac{a_{11}}{v^2(t)}\beta(t) + \frac{a_{12}}{v^3(t)}\frac{d\psi(t)}{dt} + \frac{a_{13}}{v^2(t)}\delta(t) \quad (10)$$

Next, the route following model is explained. The vehicle plant model can be expressed as a state space model as in the following Formula (11) to Formula (14).

[Equation 5]

$$A = \begin{bmatrix} a_{11} & \left(-v_x(t) + \frac{a_{12}}{v_x(t)}\right) \\ \frac{a_{21}}{v_x(t)} & \frac{a_{22}}{v_x(t)} \end{bmatrix} \quad (11)$$

$$B = \begin{bmatrix} a_{13} \\ a_{23} \end{bmatrix} \quad (12)$$

$$x = \begin{bmatrix} v_y(t) \\ \frac{d\psi(t)}{dt} \end{bmatrix} \quad (13)$$

$$\frac{dx(t)}{dt} = Ax(t) + B\delta(t) \quad (14)$$

Assuming that a line linking the reference point and the vehicle, and the tangent line of the reference point are orthogonal to each other, the route length Sr is represented by the following Formula (15) by using the signed distance z which is the distance between the vehicle and the reference point depicted in FIG. 2. The signed distance z is represented as in the following Formula (16).

[Equation 6]

$$s_r(t) = \int^t \frac{v(\tau)\cos(\theta(\tau))}{1 - \kappa_r(\tau)z(\tau)} dt \quad (15)$$

$$z(t) = \int^t v(\tau)\sin(\theta(\tau))dt \quad (16)$$

The azimuth deviation θ depicted in FIG. 2 is calculated in accordance with the following Formula (17) using the slip angle β, the yaw angle ψ and the posture angle φ of the reference point.

[Equation 7]

$$\theta(t) = \psi(t) + \beta(t) - \varphi(s_r) \quad (17)$$

By assigning Formula (1) and Formula (2) to Formula (12), the azimuth deviation θ can also be calculated in accordance with the following Formula (18). Furthermore, it is assumed that the following Formula (19) holds true for a speed at which the lateral deviation of the vehicle changes, and a speed at which the azimuth deviation of the vehicle changes.

[Equation 8]

$$\theta(t) = \int^t \left\{ \kappa(\tau)v(\tau) - \frac{v(\tau)\cos(\theta(\tau))}{1 - \kappa_r(\tau)z(\tau)} \right\} dt \quad (18)$$

$$\frac{dz(t)}{dt} = -\rho v_x(t) \quad (19)$$

By redefining the state equation by using Formula (11) to Formula (14) and Formula (17) to Formula (19), the following Formula (20) to Formula (25) hold true. By using Formula (20) to Formula (25), a track along which the vehicle travels can be calculated on the basis of the curvature and the steering angle.

[Equation 9]

$$A = \begin{bmatrix} a_{11} & \left(-v_x(t) + \frac{a_{12}}{v_x(t)}\right) & 0 & 0 \\ \frac{a_{21}}{v_x(t)} & \frac{a_{22}}{v_x(t)} & 0 & 0 \\ 1 & 0 & 0 & -v_x(t) \\ 0 & 1 & 0 & 0 \end{bmatrix} \quad (20)$$

$$B = \begin{bmatrix} a_{13} & 0 \\ a_{23} & 0 \\ 0 & 0 \\ 0 & -v_x(t) \end{bmatrix} \quad (21)$$

$$C = \begin{bmatrix} 0 & 0 & 1 & 0 \\ 0 & 0 & 0 & 1 \end{bmatrix} \quad (22)$$

$$u = \begin{bmatrix} \delta(t) \\ \rho \end{bmatrix} \quad (23)$$

$$x = \begin{bmatrix} v_y(t) \\ \frac{d\psi(t)}{dt} \\ z(t) \\ \theta(t) \end{bmatrix} \quad (24)$$

$$\frac{dx(t)}{dt} = Ax(t) + Bu(t) \quad (25)$$

By inputting, to the thus-generated vehicle model of the continuous-time type, the weight m of the vehicle, the distance lf from the center of mass to the front wheels and the distance lr from the center of mass to the rear wheels calculated on the basis of the center-of-mass position of the vehicle, the longitudinal speed vx and the lateral speed vy, the generating section 122 updates the vehicle model of the continuous-time type.

Since the generating section 122 updates the vehicle model in this manner, the generating section 122 can update the vehicle model in accordance with at least any one of the weight of the vehicle, the center-of-mass position of the vehicle and the speed of the vehicle that are acquired periodically. As a result, the generating section 122 can generate the vehicle model corresponding to changes of the weight of the vehicle, the center-of-mass position of the vehicle and the speed of the vehicle without delays.

Next, the state equation of the discrete-time type is derived. The state equation after discretization is represented by the following Formula (26) to Formula (29). T means a sampling interval.

[Equation 10]

$$x[k+1]=A_d x[k]+B_d u[k] \quad (26)$$

$$y[k]=C_d x[k] \quad (27)$$

$$x[k]=x(kT) \quad (28)$$

$$u[k]=u(kT) \quad (29)$$

Since the solution of the state equation of the continuous-time type is represented by the following Formula (30), the following Formula (31) and Formula (32) can be derived by assigning Formula (30) to Formula (26).

[Equation 11]

$$x(t)=e^{At}x_0+\int_0^t e^{A(t-\tau)}Bu(\tau)d\tau \quad (30)$$

$$x((k+1)T)+e^{A(k+1)T}x_0+e^{A(k+1)T}\int_0^{(k+1)T}e^{-A\tau}Bu(\tau)d\tau \quad (31)$$

$$x(kT)=e^{AkT}x_0+e^{AkT}\int_0^{kT}e^{-A\tau}Bu(\tau)d\tau \quad (32)$$

If the zero-order hold is represented as in the following Formula (33), the state variable of each sampling interval can be represented by the following Formula (34) by assigning Formula (33) to Formula (32).

[Equation 12]

$$u(t)-u(kT)=u[k]-\text{constant } (kT \le t < (k+1)T) \quad (33)$$

$$x((k+1)T)-e^{AT}x(kT)= \quad (34)$$

$$e^{A(k+1)T}\left[\int_0^{(k+1)T}e^{-A\tau}Bu(\tau)d\tau - \int_0^{kT}e^{-A\tau}Bu(\tau)d\tau\right]$$

Furthermore, the following Formula (35) can be derived from Formula (34).

[Equation 13]

$$x((k+1)T) = e^{AT}x(kT) + e^{A(k+1)T}\int_{kT}^{(k+1)T}e^{-A\tau}Bu(\tau)d\tau \quad (35)$$

$$= e^{AT}x(kT) + e^{AT}\int_0^T e^{-A\tau}Bu(kT)d\tau$$

$$= e^{AT}x(kT) + \int_0^T e^{-A\lambda}Bu(kT)d\lambda$$

Next, by defining the following Formula (36) and Formula (37), the state equation of the discrete-time type can be represented by the following Formula (38).

[Equation 14]

$$\lambda=T-t \quad (36)$$

$$t=\tau+kT \quad (37)$$

$$x[k+1]=e^{AT}x[k]+\int_0^T e^{A\lambda}d\lambda Bu[k] \quad (38)$$

By comparing coefficients in Formula (26) and Formula (38), the coefficient matrix of the state equation can be represented by the following Formula (39) and Formula (40).

[Equation 15]

$$A_d=e^{AT} \quad (39)$$

$$B_d=\int_0^T e^{-A\lambda}d\lambda B \quad (40)$$

Whereas the state space equation of the discrete-time type is derived from the state equation which is the vehicle model of the continuous-time type in this manner, Formula (40) includes movements of the vehicle in the past periods since it is an equation including integration. As a result, the vehicle model of the current period cannot be generated highly precisely. In view of this, the generating section 122 derives the following Formula (42) and Formula (43) by using the following Formula (41) that hold trues in the matrix exponential of A and B.

[Equation 16]

$$\begin{bmatrix} M_{11} & M_{12} \\ 0 & J \end{bmatrix} = e^{\begin{bmatrix} A & B \\ 0 & 0 \end{bmatrix}T} \quad (41)$$

$$A_d = M_{11} \quad (42)$$

$$B_d = M_{12} \quad (43)$$

The generating section 122 generates the vehicle model of the discrete-time type by using Formula (41) to Formula (43). Since the generating section 122 operates in this manner, the generating section 122 can generate the highly precise vehicle model of the discrete-time type. Furthermore, since the generating section 122 can omit calculation of movements of the vehicle in the past periods, the calculation time can be shortened. As a result, the generating section 122 can periodically generate the highly precise vehicle model.

Returning to FIG. 1, the identifying section 123 identifies a corrected lateral deviation and a corrected azimuth deviation from which a noise included in the lateral deviation and the azimuth deviation that are acquired by the acquiring section 121 is excluded. For example, the noise is an observation noise or a system noise, and includes a measurement error included when the state identifying device 1 identifies the lateral deviation or the azimuth deviation.

The identifying section 123 estimates a noise included in the lateral deviation and the azimuth deviation that are acquired by the acquiring section 121 by inputting the steering angle and the curvature that are acquired by the acquiring section 121 to the state space model corresponding to the first vehicle model corresponding to the longitudinal speed, the lateral speed, the weight and the center-of-mass position that are acquired by the acquiring section 121. The identifying section 123 identifies a corrected lateral deviation and a corrected azimuth deviation from which the estimated noise is excluded.

The identifying section 123 identifies a corrected lateral deviation and a corrected azimuth deviation from which a noise included in the lateral deviation and the azimuth deviation that are acquired by the acquiring section 121 is excluded, by inputting the steering angle and the curvature of a road surface where the vehicle is travelling that are acquired by the acquiring section 121 to the first vehicle model generated by the generating section 122. For example, the identifying section 123 identifies the corrected lateral deviation and the corrected azimuth deviation by using the state equation using the linear Kalman filter.

In a case where it is assumed that an observation noise v and a system noise ω that the identifying section 123 excludes are white noises, the state space model (i.e. the state equation) using the linear Kalman filter can be represented by the following Formula (44) and Formula (45).

[Equation 17]

$$x[k+1]=A_d x[k]+B_d u[k]+w[k] \quad (44)$$

$$y[k]=C_d x[k]+v[k] \quad (45)$$

Next, a prior estimated value xε can be calculated as in the following Formula (46) on the basis of Formula (44) and Formula (45). Furthermore, in a case where there is a deviation between the prior estimated value and the state quantity due to the influence of the system noise, the prior estimated value xε can be corrected as in the following Formula (47). The variable h in Formula (47) is an innovation gain.

[Equation 18]

$$x_e[k|k-1]=A_d x_e[k-1]+B_d u[k-1] \quad (46)$$

$$x_e[k]=x_e[k|k-1]+h[k](y[k]-C_d x_e[k|k-1]) \quad (47)$$

In Formula (47), in a case where the influence of the observation noise decreases in accordance with changes of the value of the variable h, the influence of the system noise on the prior estimated value xε increases, and in a case where the influence of the observation noise increases in accordance with changes of the value of the variable h, the influence of the system noise on the prior estimated value xε decreases. In view of this, the identifying section 123 updates the prior variance and the posterior variance in order to optimize the variable h. The prior variance can be represented by the following Formula (48), and the posterior variance can be represented by the following Formula (50).

[Equation 19]

$$P[k|k-1] = A_d P[k-1]A_d^T + B_d v[k]A_d^T \quad (48)$$

$$h[k] = \frac{P[k|k-1]C^T}{CP[k|k-1]C^T + w[k]} \quad (49)$$

$$P[k] = (I - h[k]C^T)P[k|k-1] \quad (50)$$

The identifying section 123 optimizes the weighting of the observation noise and the system noise by adjusting the variable h, which is the innovation gain, by using the state equation (i.e. the state space model) represented by Formula (48) to Formula (50). For example, if the weight on the observation noise is increased, the innovation gain decreases since the denominator in Formula (49) increases. On the other hand, if the weight on the system noise is increased, the innovation gain increases since the numerator in Formula (49) increases. Since the state matrices Ad and Bd are defined as being time-invariant, it is considered that if the observation noise and the system noise are white noises, the state variable of the linear time-invariant state equation in infinite time converges to a steady-state value.

In this manner, the identifying section 123 identifies the observation noise and the system noise included in the lateral deviation and the azimuth deviation that are acquired by the acquiring section 121 by adjusting the variable h, which is the innovation gain included in the state space model. The identifying section 123 identifies the corrected lateral deviation and the corrected azimuth deviation from which the identified observation noise and system noise are excluded, from the lateral deviation and the azimuth deviation that are acquired by the acquiring section 121. Since the identifying section 123 identifies the observation noise and the system noise by optimizing the weighting of the observation noise and the system noise, and identifies the corrected lateral deviation and the corrected azimuth deviation from which the observation noise and the system noise are excluded, the driving control device 10 can calculate a highly precise corrected steering angle based on the corrected lateral deviation and the corrected azimuth deviation.

The calculating section 124 inputs the lateral deviation, the azimuth deviation and the curvature that are acquired by the acquiring section 121 to the evaluation function corresponding to the first vehicle model corresponding to the longitudinal speed, the lateral speed, the weight and the center-of-mass position that are acquired by the acquiring section 121. Then, the calculating section 124 calculates the corrected steering angle for minimizing or maximizing the output value of the evaluation function. The calculating section 124 inputs the lateral deviation and the azimuth deviation of the vehicle, and the curvature of a road surface where the vehicle is travelling that are acquired by the acquiring section 121 to the evaluation function corresponding to the first vehicle model generated by the generating section 122.

The calculating section 124 may input the corrected lateral deviation and the corrected azimuth deviation that are identified by the identifying section 123, and the curvature to the evaluation function, and calculate the corrected steering angle for minimizing or maximizing the output value of the evaluation function. For example, instead of the corrected lateral deviation and the corrected azimuth deviation that are identified by the identifying section 123, the calculating section 124 inputs the lateral deviation and the azimuth deviation that are acquired by the acquiring section 121 to the evaluation function.

For example, the evaluation function used by the calculating section 124 is the following Formula (51). ρ is the prediction horizon, Δδ is the difference from the steering angle input of the last period, and max and min which are suffixes of input and output variables are the upper and lower limit values of the respective signals. RΔ, Q, Ru and ρs are weighting coefficients. ε is a slack variable. The predicted value of the state variable is periodically calculated in accordance with the following Formula (52). In the present embodiment, for example, the calculating section 124 calculates a corrected steering angle for minimizing the output value J in the following Formula (51).

[Equation 20]

$$\min_{u[k],u[k+1],\ldots,u[k+p-1]} J = \quad (51)$$

$$\sum_{k_t=1}^{p} \left( x^T[k+k_t]Qx[k+k_t] + \Delta\delta^2[k+k_t]R_\Delta + \delta[k+k_t]R_u \right) + \rho_s \in$$

$$\text{subject to } x_{min} - \epsilon V_{min} \le x[k+k_t] \le x_{max} + \epsilon V_{max} \quad (52)$$

$$\delta_{min} - \epsilon V_{\delta min} \le \delta[k+k_t] \le \delta_{max} + \epsilon V_{\delta max}$$

$$\Delta\delta_{min} - \epsilon V_{\Delta min} \le \Delta\delta[k+k_t] \le \Delta\delta_{max} + \epsilon V_{\Delta max}$$

$$x[k+k_L+1] = A_d x[k+k_t] + B_d u[k+k_L]$$

Since the calculating section 124 calculates the corrected steering angle for minimizing the output value J of the evaluation function in this manner, the driving control device 10 can cause the vehicle to travel through positions with small errors from the target track at respective times in a plurality of periods. The travel control section 125 causes the vehicle to travel on the basis of the corrected steering angle calculated by the calculating section 124. The travel control section 125 causes the vehicle to travel at the steering angle according to the corrected steering angle calculated by the calculating section 124 by periodically outputting the corrected steering angle to the travel control device 2.

Figure 3A:
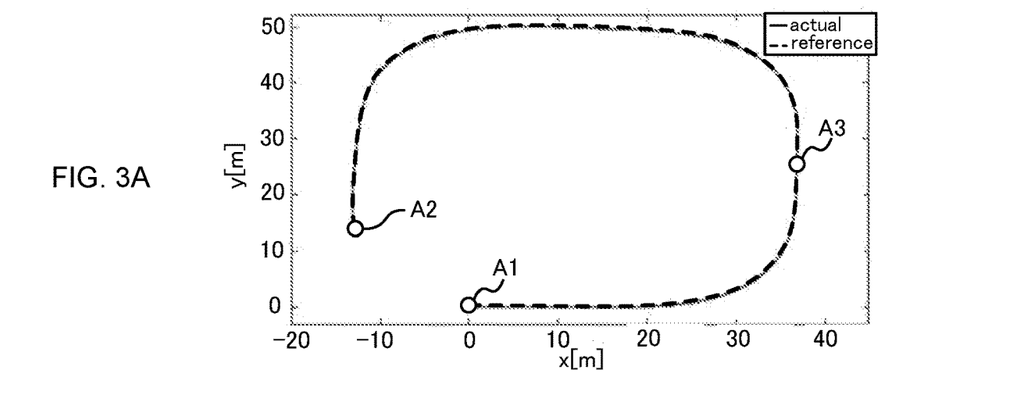
FIG. 3A is a figure for depicting a target track and positions where the vehicle travelled.
Figure 3B:
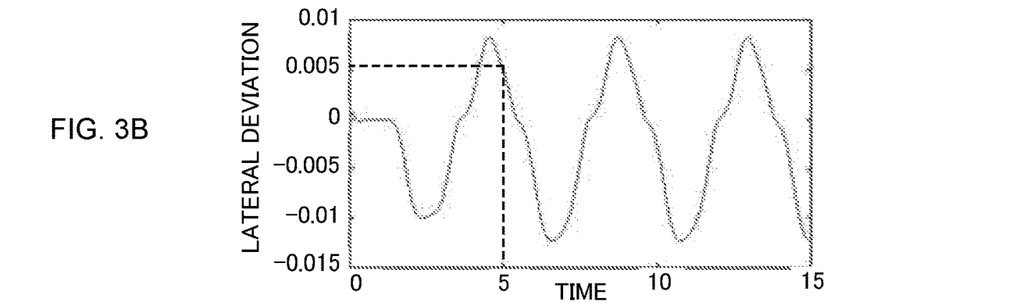
FIG. 3B is a figure depicting the lateral deviation of the vehicle at times of travelling of the vehicle.
Figure 3C:
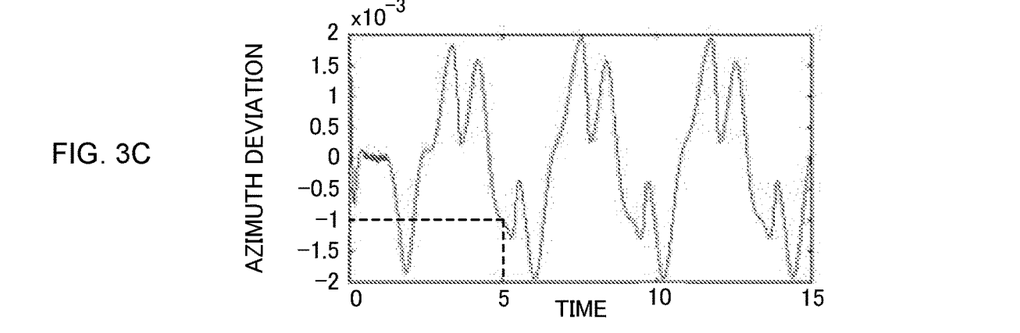
FIG. 3C is a figure for depicting the azimuth deviation of the vehicle at the times of travelling of the vehicle.
Figure 3D:
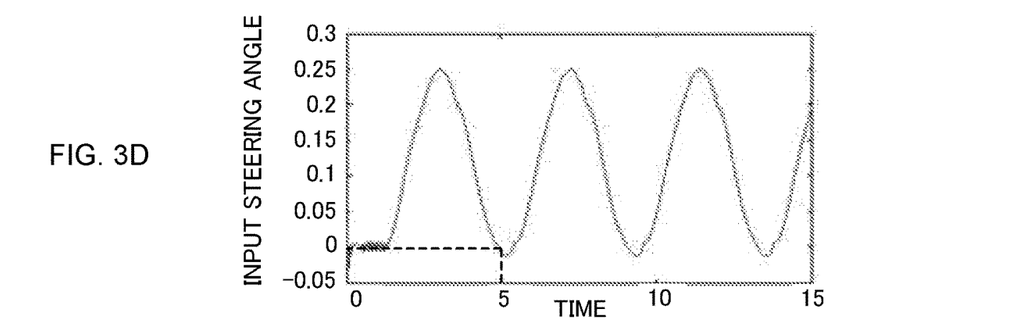
FIG. 3D is a figure for depicting the steering angle of the vehicle at the times of travelling of the vehicle.

FIGS. 3A, 3B, 3C, and 3D are figures depicting results of travelling of the vehicle on the basis of the corrected steering angle. FIG. 3A is a figure depicting a target track and positions where the vehicle travelled. FIG. 3B is a figure depicting the lateral deviation of the vehicle at times of travelling of the vehicle. FIG. 3C is a figure depicting the azimuth deviation of the vehicle at the times of travelling of the vehicle. FIG. 3D is a figure depicting the steering angle of the vehicle at the times of travelling of the vehicle.

In FIG. 3A, a position A1 is the position where the vehicle starts travelling. A position A2 is the position where the vehicle ends travelling. A position A3 is a position where the vehicle travels five seconds after the vehicle starts travelling. The broken line represents the target track, and the solid line represents positions where the vehicle travelled. As depicted in FIG. 3A, there are not large deviations of the positions where the vehicle travelled from positions represented by the target track, from the start of the travelling to the end of the travelling.

In FIG. 3B, the horizontal axis represents times, and the vertical axis represents the lateral deviation. The times are expressed in seconds, and the lateral deviation represented by the vertical axis is expressed in meters. For example, the lateral deviation of the vehicle at the position A3 depicted in FIG. 3A is approximately 0.005 meters. As depicted in FIG. 3B, the vehicle is travelling in a state where the lateral deviation does not exceed a certain range.

In FIG. 3C, the horizontal axis represents times, and the vertical axis represents the azimuth deviation. The times are expressed in seconds, and the azimuth deviation represented by the vertical axis is expressed in radians. For example, the azimuth deviation of the vehicle at the position A3 depicted in FIG. 3A is approximately −1 radian. As depicted in FIG. 3C, the vehicle is travelling in a state where the azimuth deviation does not exceed a certain range.

In FIG. 3D, the horizontal axis represents times, and the vertical axis represents the steering angle of the vehicle. The times are expressed in seconds, and the steering angle represented by the vertical axis is expressed in radians. For example, the steering angle of the vehicle at the position A3 depicted in FIG. 3A is approximately 0 radian. As depicted in FIG. 3D, the vehicle is travelling in a state where the steering angle does not exceed a certain range.

Flowchart of Driving Control Device 10

Figure 4:
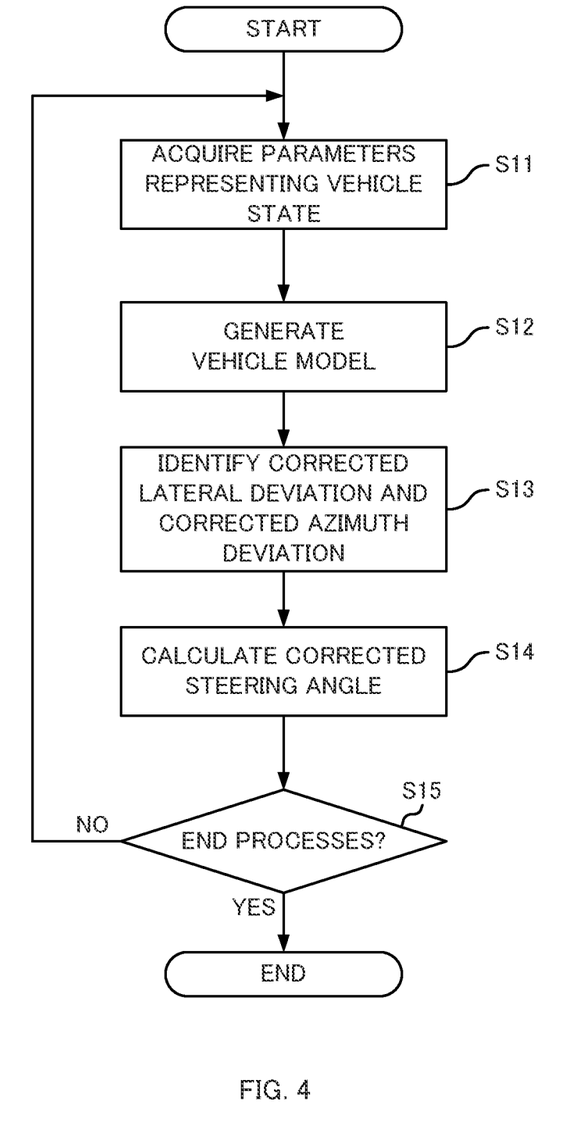
FIG. 4 is a flowchart depicting an example of an operation performed by a driving control device 10.

FIG. 4 is a flowchart depicting an example of an operation performed by the driving control device 10. The flowchart depicted in FIG. 4 depicts an operation performed by the driving control device 10 to calculate the corrected steering angle on the basis of parameters representing the state of the vehicle that are acquired from the state identifying device 1.

The acquiring section 121 acquires, as parameters representing the vehicle state, the weight of the vehicle, the center-of-mass position of the vehicle, the longitudinal speed of the vehicle, the lateral speed of the vehicle, the steering angle of the vehicle, the lateral deviation of the vehicle, the azimuth deviation of the vehicle and the curvature of a road surface where the vehicle is travelling (S11). The generating section 122 generates the first vehicle model corresponding to the weight of the vehicle, the center-of-mass position of the vehicle, the longitudinal speed of the vehicle and the lateral speed of the vehicle that are acquired by the acquiring section 121 (S12).

The identifying section 123 identifies the corrected lateral deviation and the corrected azimuth deviation from which the observation noise and the system noise included in the lateral deviation of the vehicle and the azimuth deviation of the vehicle that are acquired by the acquiring section 121 are excluded, by inputting the steering angle of the vehicle and the curvature of the road surface where the vehicle is travelling that are acquired by the acquiring section 121 to the state space model corresponding to the first vehicle model generated by the generating section 122 (S13).

The calculating section 124 inputs the curvature acquired by the acquiring section 121, and the corrected lateral deviation and the corrected azimuth deviation that are identified by the identifying section 123 to the evaluation function corresponding to the first vehicle model generated by the generating section 122, and calculates the corrected steering angle for minimizing the output value of the evaluation function (S14).

In a case where manipulation to end the processes is not performed (NO at S15), the driving control device 10 repeats the processes from S11 to S14 for calculating the corrected steering angle on the basis of parameters representing the vehicle state that are acquired at the time of the next period. In a case where manipulation to end the processes is performed (YES at S15), the driving control device 10 ends the processes.

First Modification Example

Whereas the explanation above illustrates an operation in which the generating section 122 generates the first vehicle model corresponding to parameters representing the vehicle state that are acquired by the acquiring section 121, and the calculating section 124 calculates the corrected steering angle by using the evaluation function corresponding to the first vehicle model, the calculating section 124 may calculate at least any one of the corrected acceleration and the corrected steering angle for minimizing or maximizing the output value of the evaluation function. The configuration of the driving control system S according to modification examples is the same as the configuration of the driving control system S depicted in FIG. 1.

The identifying section 123 identifies the corrected longitudinal speed, the corrected lateral speed, the corrected lateral deviation and the corrected azimuth deviation from which a noise included in the longitudinal speed of the vehicle, the lateral speed of the vehicle, the lateral deviation of the vehicle and the azimuth deviation of the vehicle that are acquired by the acquiring section 121 is excluded. The identifying section 123 estimates the noise included in the longitudinal speed, the lateral speed, the lateral deviation and the azimuth deviation that are acquired by the acquiring section 121, and identifies the corrected longitudinal speed, the corrected lateral speed, the corrected lateral deviation and the corrected azimuth deviation from which the noise is excluded, by inputting the steering angle and the curvature that are acquired by the acquiring section 121 to the first vehicle model corresponding to the weight and the center-of-mass position that are acquired by the acquiring section 121. For example, the identifying section 123 identifies the corrected longitudinal speed, the corrected lateral speed, the corrected lateral deviation and the corrected azimuth deviation by using the non-linear Kalman filter.

The calculating section 124 inputs the longitudinal speed, the lateral speed, the lateral deviation, the azimuth deviation and the curvature that are acquired by the acquiring section 121 to the evaluation function corresponding to the first vehicle model corresponding to the weight and the center-of-mass position that are acquired by the acquiring section 121, and calculates at least any one of the corrected acceleration and the corrected steering angle for minimizing or maximizing the output value of the evaluation function. The calculating section 124 inputs the longitudinal speed of the vehicle, the lateral speed of the vehicle, the lateral deviation of the vehicle, the azimuth deviation of the vehicle and the curvature of a road surface where the vehicle is travelling that are acquired by the acquiring section 121 to the evaluation function corresponding to the first vehicle model generated by the generating section 122.

Since the calculating section 124 calculates the corrected acceleration in this manner, the driving control device 10 can give instructions about accelerations for causing the vehicle to travel along a target track along with steering angles to the travel control device 2. As a result, differences between positions where the vehicle travels and the target track can be reduced further.

The calculating section 124 may input the corrected longitudinal speed, the corrected lateral speed, the corrected lateral deviation and the corrected azimuth deviation that are identified by the identifying section 123, and the curvature to the evaluation function. Then, the calculating section 124 may calculate at least any one of the corrected acceleration and the corrected steering angle for minimizing or maximizing the output value of the evaluation function. For example, instead of the corrected longitudinal speed, the corrected lateral speed, the corrected lateral deviation and the corrected azimuth deviation that are identified by the identifying section 123, the calculating section 124 inputs the longitudinal speed, the lateral speed, the lateral deviation and the azimuth deviation that are acquired by the acquiring section 121 to the evaluation function.

In a case where the generating section 122 generates the first vehicle model and a second vehicle model which is a non-linear vehicle model different from the first vehicle model, the calculating section 124 may calculate at least any one of the corrected acceleration and the corrected steering angle by using at least one of the first vehicle model and the second vehicle model. For example, the second vehicle model is a non-linear vehicle model using the Jacobian matrix.

Since the calculating section 124 inputs the longitudinal speed, the lateral speed, the lateral deviation and the azimuth deviation of the vehicle, and the curvature to the evaluation function corresponding to the second vehicle model, and calculates at least any one of the corrected acceleration and the corrected steering angle for minimizing or maximizing the output value of the evaluation function in this manner, the calculating section 124 can highly precisely calculate the acceleration or the steering angle for causing the vehicle to travel along the target track.

The travel control section 125 causes the vehicle to travel on the basis of at least any one of the corrected acceleration and the corrected steering angle calculated by the calculating section 124. The travel control section 125 causes the vehicle to travel at a speed according to the corrected acceleration calculated by the calculating section 124 or a steering angle according to the corrected steering angle calculated by the calculating section 124 by periodically outputting at least any one of the corrected acceleration and the corrected steering angle to the travel control device 2.

Figure 5:
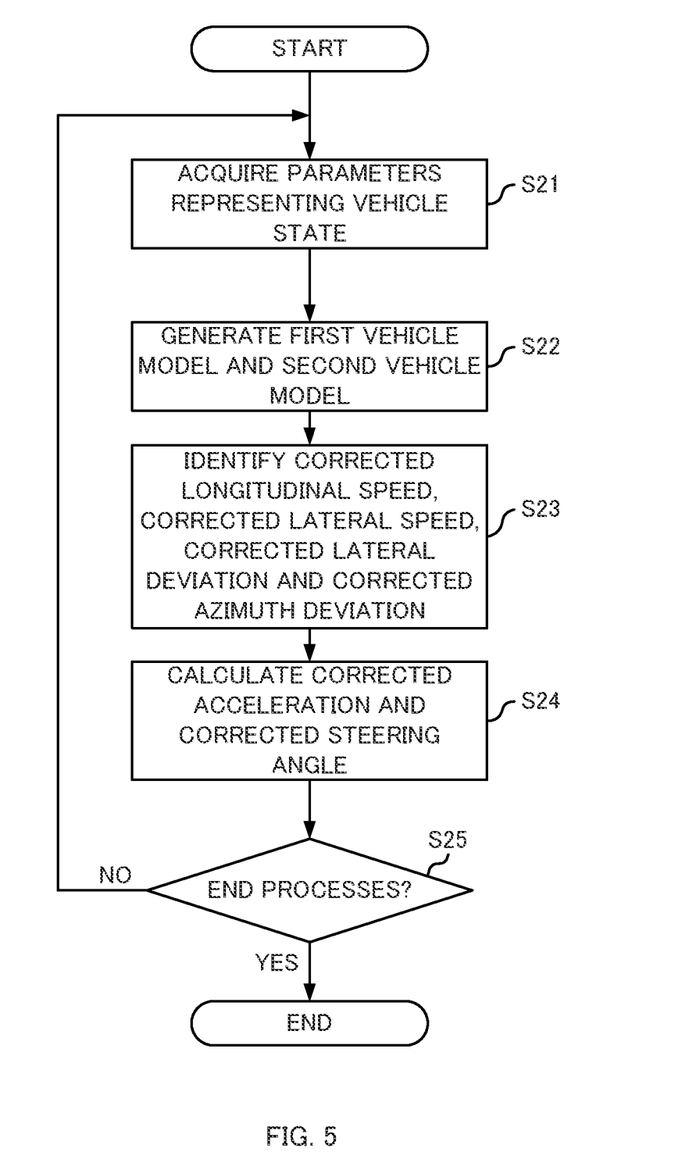
FIG. 5 is a flowchart depicting an example of an operation performed by the driving control device 10 according to a first modification example.

Flowchart of Driving Control Device 10 According to First Modification Example FIG. 5 is a flowchart depicting an example of an operation performed by the driving control device 10 according to the first modification example. The flowchart depicted in FIG. 5 depicts an operation performed by the driving control device 10 to calculate the corrected acceleration and the corrected steering angle on the basis of parameters representing the state of the vehicle that are acquired from the state identifying device 1.

The acquiring section 121 acquires, as parameters representing the vehicle state, the weight of the vehicle, the center-of-mass position of the vehicle, the longitudinal speed of the vehicle, the lateral speed of the vehicle, the steering angle of the vehicle, the lateral deviation of the vehicle, the azimuth deviation of the vehicle and the curvature of a road surface where the vehicle is travelling (S21). The generating section 122 generates the first vehicle model and the second vehicle model corresponding to the weight of the vehicle and the center-of-mass position of the vehicle that are acquired by the acquiring section 121 (S22).

The identifying section 123 identifies the corrected longitudinal speed, the corrected lateral speed, the corrected lateral deviation and the corrected azimuth deviation from which the observation noise and the system noise included in the longitudinal speed of the vehicle, the lateral speed of the vehicle, the lateral deviation of the vehicle and the azimuth deviation of the vehicle that are acquired by the acquiring section 121 are excluded, by inputting the steering angle of the vehicle and the curvature of the road surface where the vehicle is travelling that are acquired by the acquiring section 121 to the state space model corresponding to the first vehicle model generated by the generating section 122 (S23).

The calculating section 124 inputs the curvature acquired by the acquiring section 121, and the corrected longitudinal speed, the corrected lateral speed, the corrected lateral deviation and the corrected azimuth deviation that are identified by the identifying section 123 to the evaluation function corresponding to at least any one of the first vehicle model and the second vehicle model generated by the generating section 122. Next, the calculating section 124 calculates the corrected acceleration and the corrected steering angle for minimizing or maximizing the output value of the evaluation function (S24).

In a case where manipulation to end the processes is not performed (NO at S25), the driving control device 10 repeats the operations from S21 to S24 for calculating the corrected acceleration and the corrected steering angle on the basis of parameters representing the vehicle state that are acquired at the time of the next period. In a case where an operation to end the processes is performed (YES at S25), the driving control device 10 ends the processes.

Second Modification Example

Whereas the explanation above illustrates an operation in which the calculating section 124 calculates at least any one of the corrected steering angle and the corrected acceleration for minimizing the output value of the evaluation function, the calculating section 124 may calculate at least any one of the corrected steering angle and the corrected acceleration for maximizing the output value of the evaluation function. For example, in a case where the reciprocal of the output value J represented by Formula (51) is output as the output value of the evaluation function, the calculating section 124 calculates at least any one of the corrected steering angle and the corrected acceleration for maximizing the output value of the evaluation function.

Effects of Driving Control Device 10

As explained above, the driving control device 10 has: the acquiring section 121 that acquires the weight, the center-of-mass position, the longitudinal speed, the lateral speed, the steering angle, the lateral deviation and the azimuth deviation of the vehicle, and the curvature of a road surface where the vehicle is travelling which are parameters representing the vehicle state; and the generating section 122 that generates the vehicle model representing the relationship among the parameters acquired by the acquiring section 121. Then, the calculating section 124 calculates the corrected steering angle for minimizing the output value of the evaluation function by inputting the lateral deviation and the azimuth deviation that are acquired by the acquiring section 121 to the evaluation function corresponding to the vehicle model corresponding to the longitudinal speed, the lateral speed, the weight and the center-of-mass position that are acquired by the acquiring section 121.

Since the driving control device 10 operates in this manner, the driving control device 10 can periodically generate the vehicle model corresponding to the weight, the center-of-mass position, the longitudinal speed and the lateral speed of the vehicle, and accordingly can calculate the steering angle for reducing the difference between a position where the vehicle travels and a target track at each time of a plurality of periods. As a result, the driving control device 10 can cause the vehicle to travel along the target track even in a case where the weight and the center-of-mass position of the vehicle change.

Although the present invention has been explained thus far by using an embodiment, the technical scope of the present invention is not limited by the scope of the description of the embodiment described above, but can be modified and changed variously within the scope of the gist. For example, all or some of devices can be configured in a functionally or physically distributed/integrated manner in any units. In addition, embodiments of the present invention include new embodiments that are generated by combining any ones of a plurality of embodiments also. Effects of the new embodiments generated by the combination combine effects of the original embodiments.

DESCRIPTION OF THE REFERENCE NUMERALS

1: State identifying device
2: Travel control device
10: Driving control device
11: Storage section
12: Control section
121: Acquiring section
122: Generating section
123: Identifying section
124: Calculating section
125: Travel control section

The invention claimed is:

1. A driving control device comprising:
an acquiring section that acquires: a weight of a vehicle; a center-of-mass position of the vehicle; a longitudinal speed which is a speed of the vehicle in an advancing direction; a lateral speed which is a speed of the vehicle in a direction orthogonal to the advancing direction; a steering angle of the vehicle; a lateral deviation of the vehicle; an azimuth deviation which is a difference between an orientation of the vehicle at a position where the vehicle is travelling and a target orientation of the vehicle corresponding to the position; and a curvature of a road surface where the vehicle is travelling;
a generating section that generates a first vehicle model representing a relationship among the longitudinal speed, the lateral speed, the weight, the center-of-mass position, the steering angle, the lateral deviation, the azimuth deviation and the curvature;
an identifying section that estimates a noise included in the lateral deviation and the azimuth deviation that are acquired by the acquiring section, and identifies a corrected lateral deviation and a corrected azimuth deviation from which the noise is excluded, by inputting the steering angle and the curvature that are acquired by the acquiring section to a state space model corresponding to the first vehicle model corresponding to the longitudinal speed, the lateral speed, the weight and the center-of-mass position that are acquired by the acquiring section;
a calculating section that inputs the curvature that are acquired by the acquiring section, the corrected lateral deviation and the corrected azimuth deviation that are identified by the identifying section to an evaluation function corresponding to the first vehicle model corresponding to the longitudinal speed, the lateral speed, the weight and the center-of-mass position that are acquired by the acquiring section, and calculates a corrected steering angle for minimizing or maximizing an output value of the evaluation function; and
a travel control section that causes the vehicle to travel on a basis of the corrected steering angle, wherein,
the generating section derives a state space model of a discrete-time type from the first vehicle model after generating the first vehicle model of a continuous-time type including a vehicle plant model representing a movement of the vehicle and a route following model representing a track along which the vehicle has moved, and
the identifying section optimizes the weighting of the observation noise and the system noise included in the lateral deviation and the azimuth deviation that are acquired by the acquiring section—where one increases as the other decreases—by adjusting the innovation gain included in the state space model using the prior variance and the posterior variance of the state space model, and identifies, from the lateral deviation and the azimuth deviation, the corrected lateral deviation and the azimuth deviation from which the observation noise and the system noise are excluded.

2. The driving control device according to claim 1, wherein
the acquiring section acquires at least any one of the weight, the center-of-mass position, the longitudinal speed and the lateral speed periodically, and
the generating section generates the first vehicle model corresponding to a time of a period next to a period corresponding to a time at which the acquiring section has acquired at least any one of the weight, the center-of-mass position, the longitudinal speed and the lateral speed.

3. The driving control device according to claim 2, wherein
the generating section updates the first vehicle model of a continuous-time type by inputting, to the first vehicle model of a continuous-time type, the weight, a distance from the center of mass to front wheels and a distance from the center of mass to rear wheels calculated on the basis of the center-of-mass position, the longitudinal speed, and the lateral speed.

4. The driving control device according to claim 1, wherein the generating section generates the prior variance and the posterior variance by calculating a prior estimated value from the state space model, and the identifying section adjusts the innovation gain by updating the prior variance and the posterior variance.

5. A driving control device comprising:

an acquiring section that acquires: a weight of a vehicle; a center-of-mass position of the vehicle; a longitudinal speed which is a speed of the vehicle in an advancing direction; a lateral speed which is a speed of the vehicle in a direction orthogonal to the advancing direction; a steering angle of the vehicle; a lateral deviation of the vehicle; an azimuth deviation which is a difference between an orientation of the vehicle at a position where the vehicle is travelling and a target orientation of the vehicle corresponding to the position; and a curvature of a road surface where the vehicle is travelling;

a generating section that generates a first vehicle model representing a relationship among the longitudinal speed, the lateral speed, the weight, the center-of-mass position, the steering angle, the lateral deviation, the azimuth deviation and the curvature;

an identifying section that estimates a noise included in the lateral deviation and the azimuth deviation that are acquired by the acquiring section, and identifies a corrected lateral deviation and a corrected azimuth deviation from which the noise is excluded, by inputting the steering angle and the curvature that are acquired by the acquiring section to a state space model corresponding to the first vehicle model corresponding to the longitudinal speed, the lateral speed, the weight and the center-of-mass position that are acquired by the acquiring section;

a calculating section that inputs the curvature that are acquired by the acquiring section, the corrected lateral deviation and the corrected azimuth deviation that are identified by the identifying section to an evaluation function corresponding to the first vehicle model corresponding to the weight and the center-of-mass position that are acquired by the acquiring section, and calculates at least any one of a corrected acceleration and a corrected steering angle for minimizing or maximizing an output value of the evaluation function; and a travel control section that causes the vehicle to travel on a basis of the at least any one of the corrected acceleration and the corrected steering angle, wherein the generating section derives a state space model of a discrete-time type from the first vehicle model after generating the first vehicle model of a continuous-time type including a vehicle plant model representing a movement of the vehicle and a route following model representing a track along which the vehicle has moved, and the identifying section optimizes the weighting of the observation noise and the system noise included in the lateral deviation and the azimuth deviation that are acquired by the acquiring section—where one increases as the other decreases—by adjusting the innovation gain included in the state space model using the prior variance and the posterior variance of the state space model, and identifies, from the lateral deviation and the azimuth deviation, the corrected lateral deviation and the azimuth deviation from which the observation noise and the system noise are excluded.

6. The driving control device according to claim 5, wherein the generating section generates the first vehicle model and a second vehicle model which is a non-linear vehicle model different from the first vehicle model, and the calculating section calculates at least any one of the corrected acceleration and the corrected steering angle by using at least one of the first vehicle model and the second vehicle model.

7. The driving control device according to claim 5, wherein the generating section generates the prior variance and the posterior variance by calculating a prior estimated value from the state space model, and the identifying section adjusts the innovation gain by updating the prior variance and the posterior variance.

* * * * *